United States Patent
Liao

(10) Patent No.: US 6,497,378 B1
(45) Date of Patent: Dec. 24, 2002

(54) WIRE-WINDING MECHANISM HAVING DUAL WIRE OUTLETS

(76) Inventor: Sheng Hsin Liao, No. 10, Alley 38, Lane 229, San Chun St., Shulin Taipei Hsien (TW)

( * ) Notice: Subject to any disclaimer, the term of this patent is extended or adjusted under 35 U.S.C. 154(b) by 0 days.

(21) Appl. No.: 09/907,927

(22) Filed: Jul. 19, 2001

(51) Int. Cl.[7] .............................................. B65H 75/48
(52) U.S. Cl. .............................. 242/378.1; 242/378.4; 191/12.2 A
(58) Field of Search .............................. 242/378, 378.1, 242/378.2, 378.3, 378.4; 191/12.2 R, 12.2 A, 12.4

(56) References Cited

U.S. PATENT DOCUMENTS

| | | | | |
|---|---|---|---|---|
| 3,474,985 A | * | 10/1969 | Brudi et al. | 242/378.4 |
| 3,751,101 A | * | 8/1973 | Miller et al. | 242/378.4 |
| 4,427,163 A | * | 1/1984 | Kondziola | 242/378.4 |
| 4,502,226 A | * | 3/1985 | Hung | 242/378.4 |
| 6,199,784 B1 | * | 3/2001 | Wang et al. | 242/378 |
| 6,289,965 B1 | * | 9/2001 | Ruggles | 242/378.4 |

* cited by examiner

Primary Examiner—John M. Jillions
(74) Attorney, Agent, or Firm—Rosenberg, Klein & Lee

(57) ABSTRACT

The present invention provides a wire-winding mechanism having dual wire outlets. The wire-winding mechanism comprises a box body, a wire-winding disk, a communication wire, and a scroll spring. The box body comprises a first and a second disk bodies pivotally joined together. The first disk body has a first wire-winding shaft. The second disk body has a shaft body and a second wire-winding shaft. The wire-winding disk is pivotally disposed in the box body. The communication wire is wound around the shaft body of the second disk body to form an inner ring portion. The communication wire is wound around the first wire-winding shaft of the first disk body to form a first outer ring portion, and is also wound around the second wire-winding shaft of the second disk body to form a second outer ring portion. The scroll spring is connected between the first and second disk bodies.

11 Claims, 7 Drawing Sheets

WIRE-WINDING MECHANISM HAVING DUAL WIRE OUTLETS

FIELD OF THE INVENTION

The present invention relates to a wire-winding mechanism having dual wire outlets and, more particularly, to an improved wire-winding box, which has an automatically winding communication wire to shrink the volume thereof for conforming to the requirement of compactness, and has dual wire outlets.

BACKGROUND OF THE INVENTION

Appropriate communication wires need to be accommodated to achieve electrical connection when using communications apparatuses such as computers, modems, telephones, or facsimile apparatuses. To avoid entanglement of wire due to a too-long length of external wire or inconvenience of use due to a too-short length of external wire, several kinds of wire-winding boxes applicable to various kinds of communications apparatuses have been proposed. Most of the wire-winding boxes comprise a wire-winding box body, a communication wire, a wire-winding disk, and a scroll spring so that the communication wire can be plugged into sockets of relevant communication apparatuses for communication of information.

A communication wire may show a tight state due to resiliency of the scroll spring when it is pulled out from a conventional wire-winding box so that a proper length of the communication wire cannot be kept outside, resulting in much trouble in use for a user. To resolve this problem, in some wire-winding boxes, a swing sheet capable of resiliently swinging is utilized, and gaps and locking grooves disposed at the periphery of a rotating disk are matched, thereby accomplishing winding or locating function.

However, in the above wire-winding box, the communication wire is wound around the wire-winding disk to be limited in space by the wire-winding disk. Moreover, outer and inner ring portions of the communication wire disposed on the wire-winding disk need to be in proportional relation. Therefore, the wire-winding disk must have a larger diameter, hence enlarging the volume of the wire-winding disk and not conforming to the requirement of compactness. Furthermore, a general wire-winding box has only a single wire outlet so that its usage is limited.

Accordingly, the above wire-winding boxes have inconvenience and drawbacks in practical use. The present invention aims to resolve the problems in the prior art.

SUMMARY OF THE INVENTION

The primary object of the present invention is to provide a wire-winding mechanism having dual wire outlets. A communication wire is respectively disposed on two faces of a first disk body of a wire-winding disk. The communication wire is divided into a first outer ring portion, a second outer ring portion, and an inner ring portion, which are disposed on a first wire-winding shaft, a second wire winding shaft, and outside a shaft body, respectively. When the communication wire is wound around the wire-winding disk, the first outer ring portion, the inner ring portion, and the second outer ring portion are staggered to reduce the diameter of the wire-winding disk. Therefore, the volume of the wire-winding box can be shrunk to conform to the requirement of compactness. Moreover, the present invention has dual wire outlets to facilitate usage of the wire-winding box.

To achieve the above object, the present invention provides a wire-winding mechanism having dual wire outlets. The wire-winding mechanism of the present invention comprises a wire-winding box body, a wire-winding disk, a communication wire, and a scroll spring. The wire-winding box body has a receiving room therein. The wire-winding box body is composed of a first disk body and a second disk body. The first and second disk bodies are pivotally joined together. A face of the first disk body has a first wire-winding shaft. A face of the second disk body has a shaft body and a second wire-winding shaft. The wire-winding disk is pivotally disposed in the receiving room of the wire-winding box body. One end of the communication wire is wound around the first wire-winding shaft of the first disk body of the wire-winding disk to form a first outer ring portion. The other end of the communication wire is wound around the shaft body of the second disk body of the wire-winding disk to form an inner ring portion, and is also wound around the second wire-winding shaft of the second disk body to form a second outer ring portion. The scroll spring is connected between the first disk body and the second disk body. A wire-winding mechanism having dual wire outlets is thus formed.

The various objects and advantages of the present invention will be more readily understood from the following detailed description when read in conjunction with the appended drawings, in which:

DETAILED DESCRIPTION OF THE PREFERRED EMBODIMENTS

Figure 1:
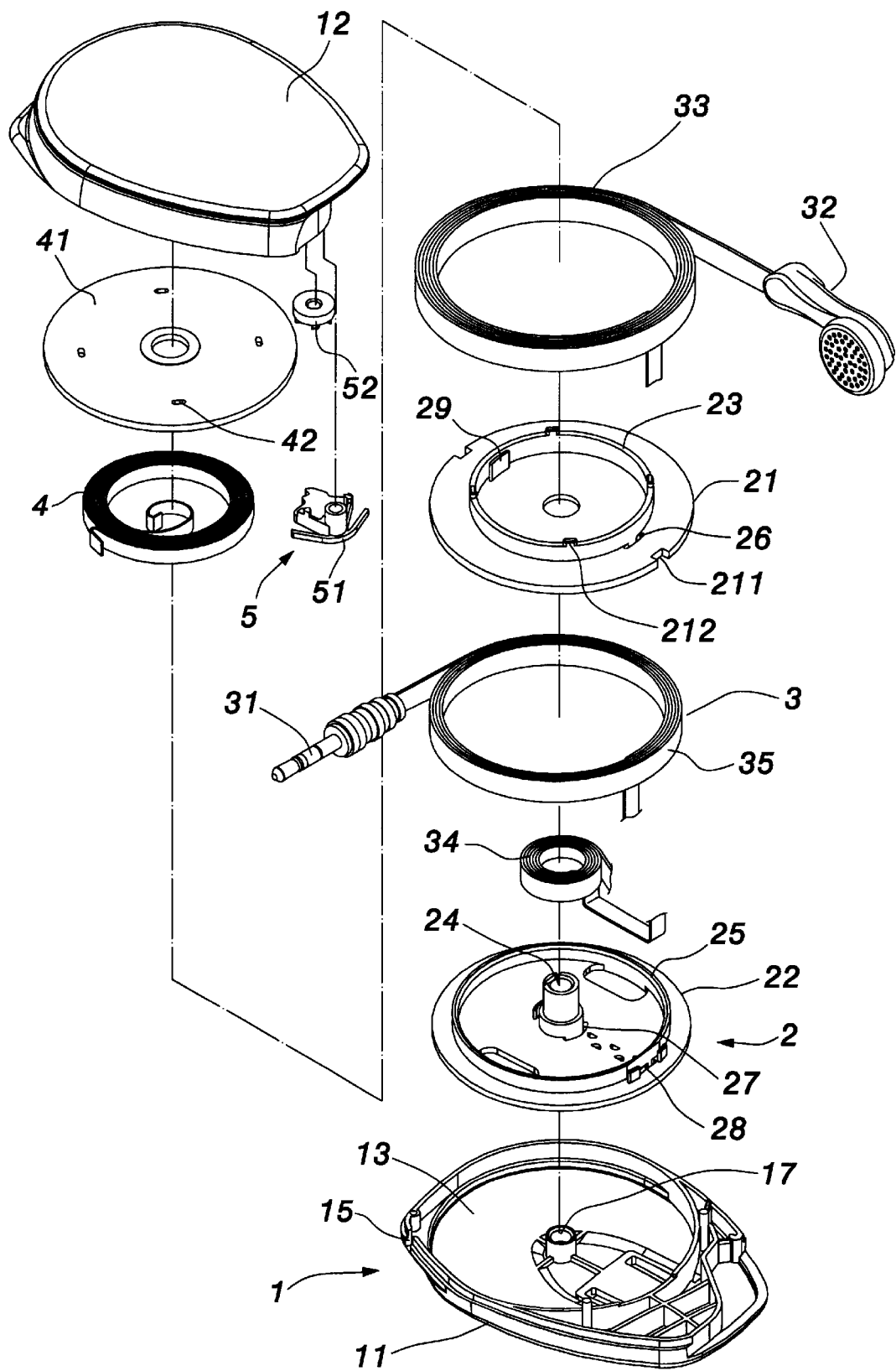
FIG. 1 is an exploded perspective view of the present invention.
Figure 2:
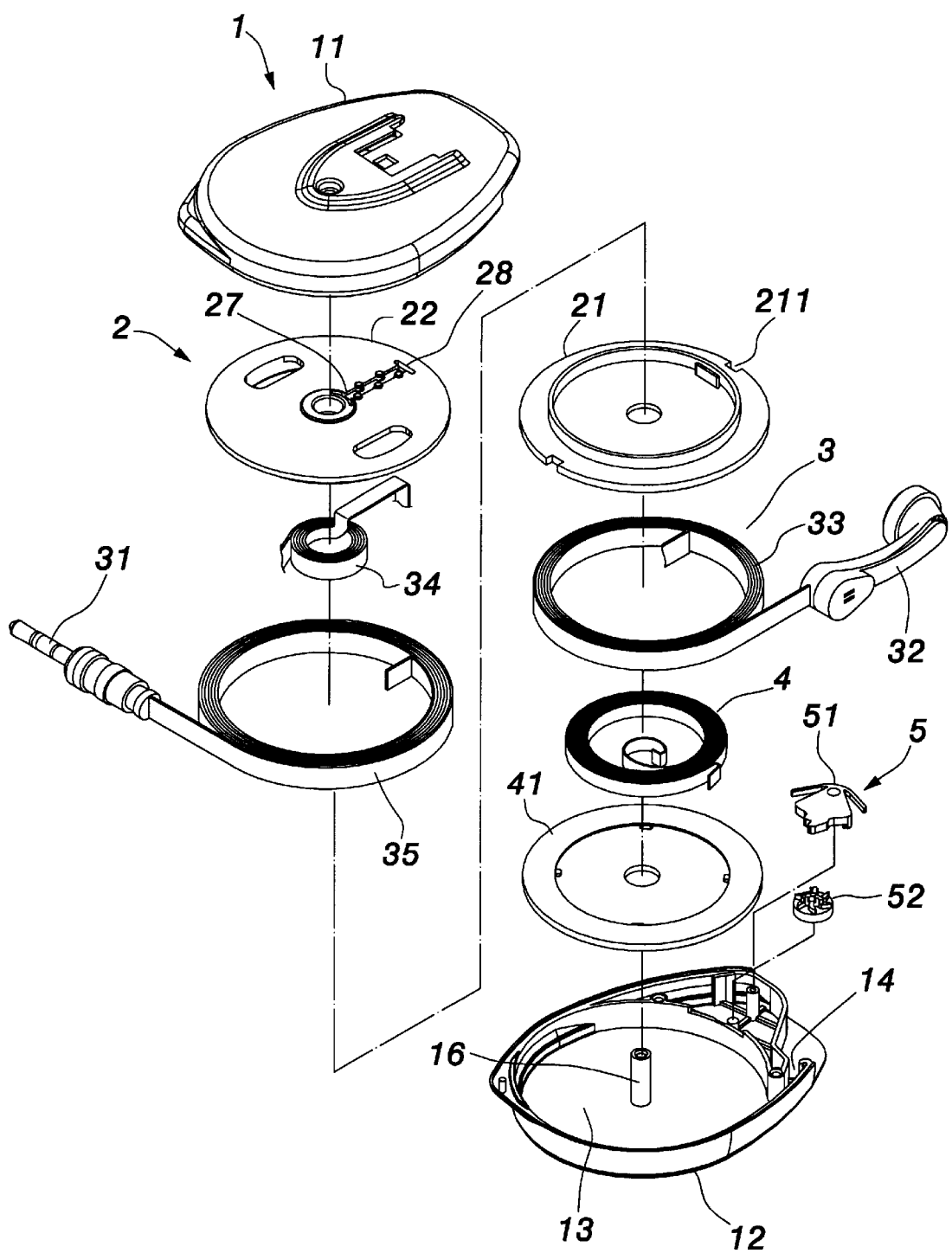
FIG. 2 is another exploded perspective view of the present invention.

As shown in FIGS. 1 to 7, a wire-winding mechanism having dual wire outlets according to a preferred embodiment of the present invention comprises a wire-winding box body 1, a wire-winding disk 2, a communication wire 3, and a scroll spring 4.

The wire-winding box body 1 is a hollow shell body formed by locking or screwing with screws a first half body 11 and a second half body 12. The wire-winding box body 1 has a depressed receiving room 13 therein to receive the communication wire 3, the wire-winding disk 2, and the scroll spring 4. A border of the receiving room 13 has a first wire hole 14 to be protruded out by one end of the communication wire 3 and a second wire hole 15 to be protruded out by the other end of the communication wire 3. An inner side face of the receiving room 13 has a hollow projective shaft 16. A bushing 17 for insertion and positioning of one end of the projective shaft 16 is disposed on the other opposed side face of the receiving room 13.

The wire-winding disk 2 is composed of a first disk body 21 and a second disk body 22. The first disk body 21 and the second disk body 22 are pivotally joined together and can make relative rotation. A face of the first disk body 21 has a hollow first wire-winding shaft 23. A face of the second disk body 22 has a hollow shaft body 24 and a hollow second wire-winding shaft 25. The first disk body 21 has a first wire-penetrating hole 26. The second disk body 22 has a second wire-penetrating hole 27 and a third wire-penetrating hole 28. The wire-winding disk 2 is received in the receiving room 13 of the wire-winding box body 1. The wire-winding disk 2 is pivotally disposed on the projective shaft 16 in the receiving room 13 through the shaft body 24 so that the wire-winding disk 2 can rotate in the receiving room 13.

Two ends of the communication wire 3 can join devices (not shown) such as a plug 31 and an earphone 32. The communication wire 3 protrudes out of the second wire-penetrating hole 27 of the second disk body 22, is wound around the shaft body 24 of the second disk body 22 of the wire-winding disk 2 to form an inner ring portion 34, penetrates through the first wire-penetrating hole 26 of the first disk body 21, and then is wound around the first wire-winding shaft 23 of the first disk body 21 of the wire-winding disk 2 to form a first outer ring portion 33. The other end of the communication wire 3 penetrates through the third wire-penetrating hole 28 of the second disk body 22, and is then wound around the second wire-winding shaft 25 of the second disk body 22 to form a second outer ring portion 35. Therefore, the communication wire 3 can be respectively disposed on the first disk body 21 and the second disk body 22 of the wire-winding disk 2. The two ends of the communication wire 3 protrude out of the first wire hole 14 and the second wire hole 15 of the wire-winding box body 1, respectively.

The scroll spring 4 is properly positioned in the first wire-winding shaft 23 of the first disk body 21 of the wire-winding disk 2. Two ends of the scroll spring 4 are retained with a retaining sheet 29 of the first disk body 21 and the shaft body 24 of the second disk body 22. The scroll spring 4 is connected between the first disk body 21 and the second disk body 22 so that the scroll spring 4 can store dynamic energy when the first disk body 21 and the second disk body 22 make relative rotation. A cover body 41 covers the first wire-winding shaft 23 of the first disk body 21 of the wire-winding disk 2. The cover body 41 has a plurality of retaining holes 42 thereon. The first wire-winding shaft 23 has a plurality of corresponding retaining bodies 212 thereon. The retaining holes 42 and the retaining bodies 212 are retained together so that the cover body 41 can be fixedly retained on the first wire-winding shaft 23, thereby letting the scroll spring 4 be firmly positioned in the first wire-winding shaft 23 and not spring out.

Figure 3:
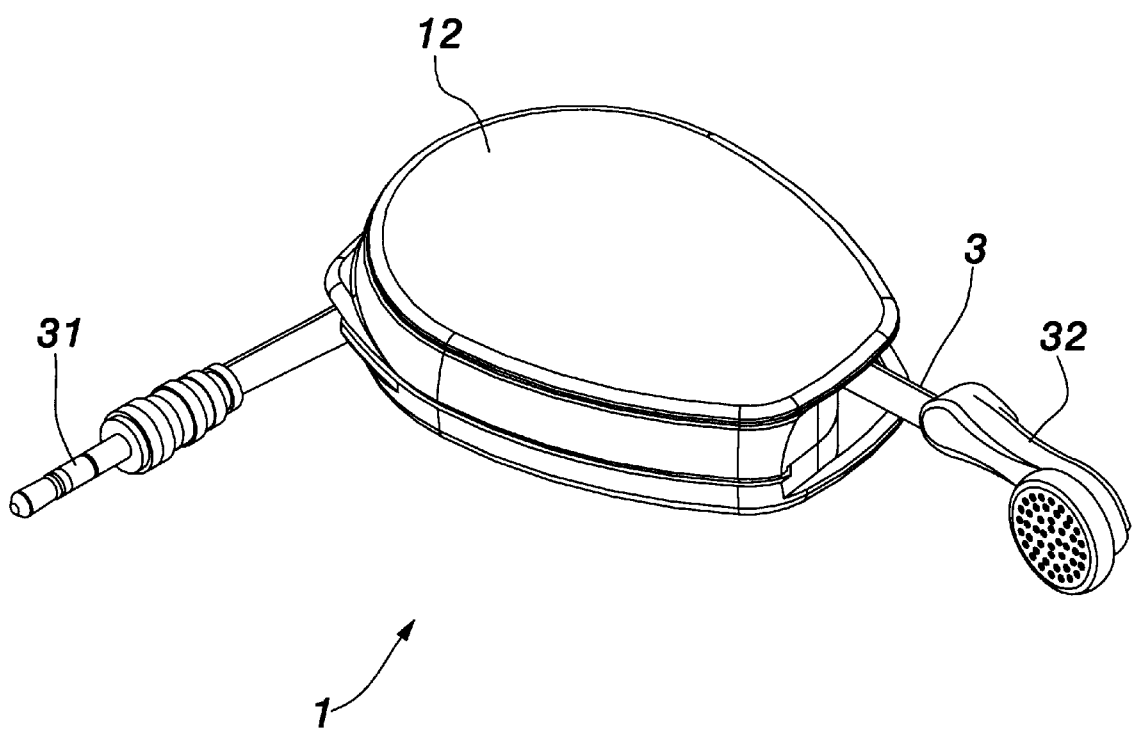
FIG. 3 is a perspective view of the present invention.
Figure 4:
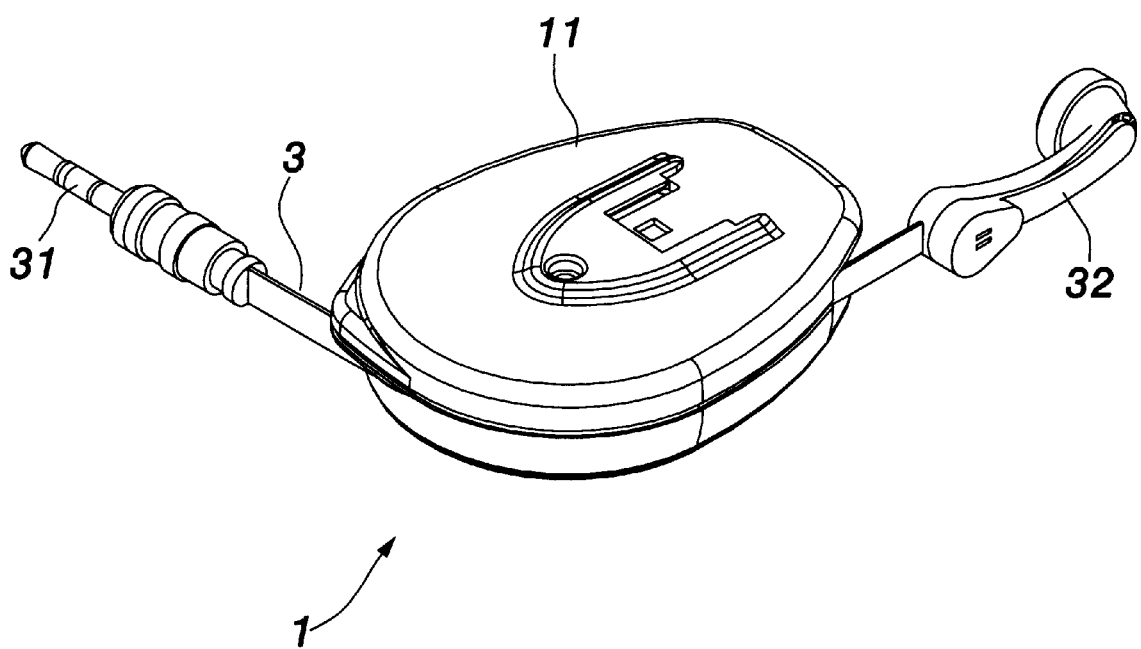
FIG. 4 is another perspective view of the present invention.
Figure 5:
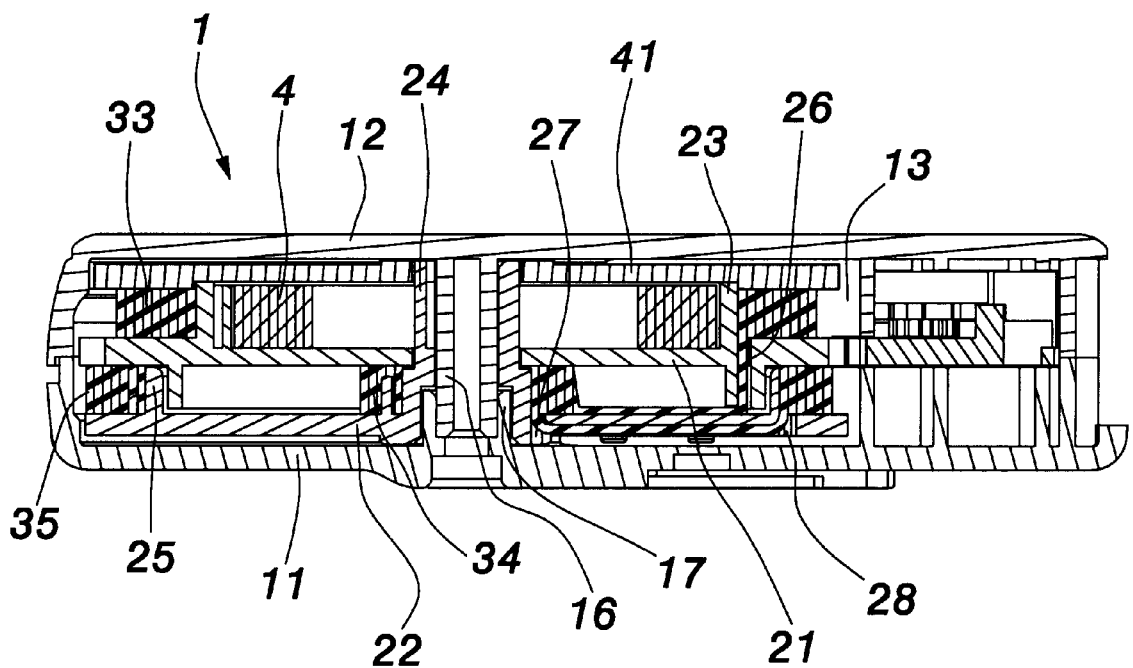
FIG. 5 is a cross-sectional view of the present invention.
Figure 6:
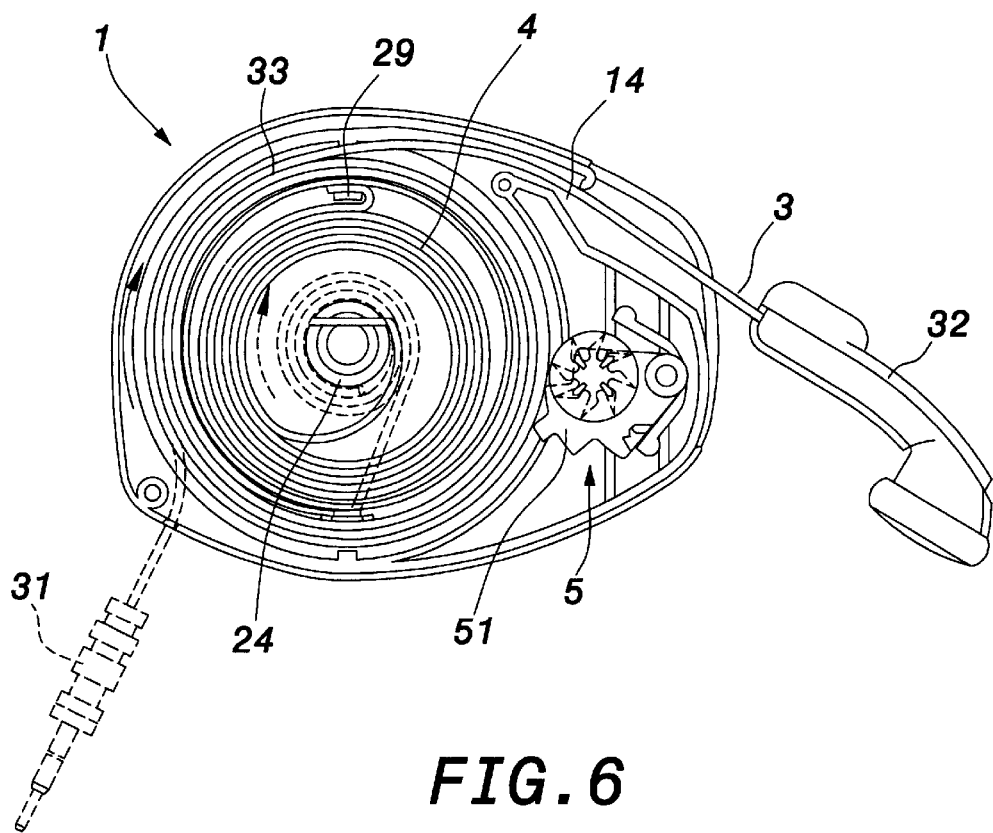
FIG. 6 is a view showing the wire-winding action of the present invention.
Figure 7:
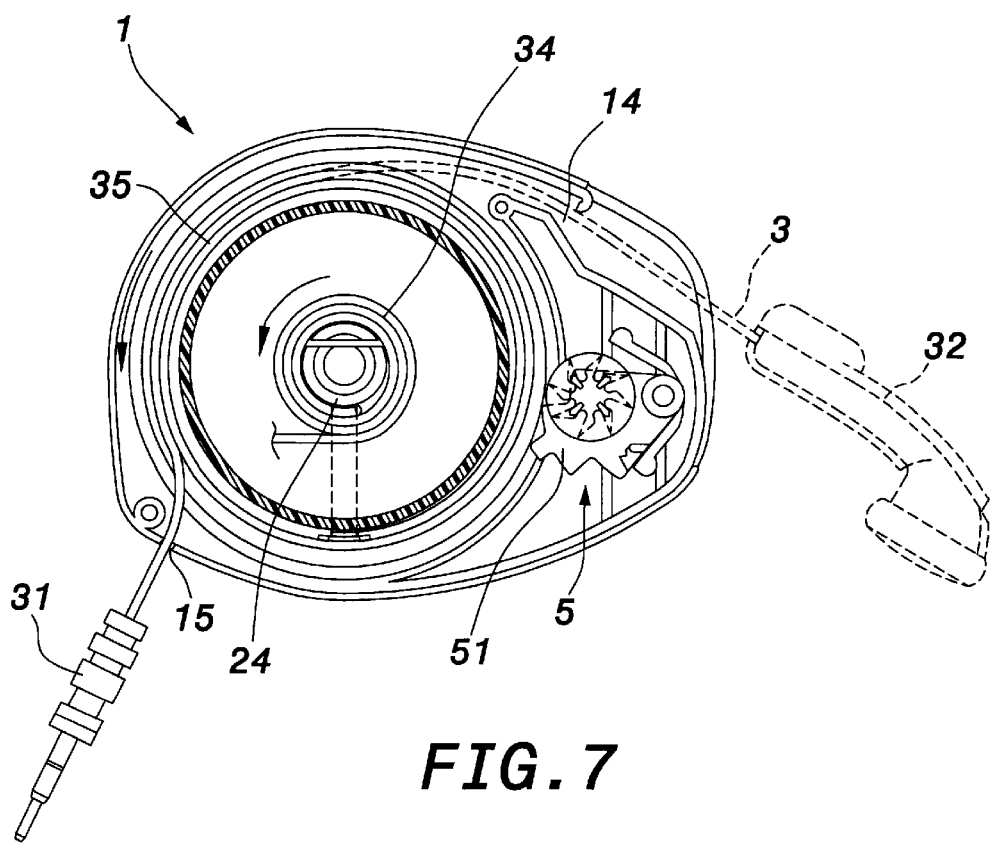
FIG. 7 is another view showing the wire-winding action of the present invention.

A wire-winding box as shown in FIGS. 3 and 4 is thus formed. In practical use, the wire-winding box can be utilized to receive the communication wire 3 of considerable length, and the communication wire 3 can be wound back at any time. A user can plug the plug 31 connected with the communication wire 3 into a socket of relevant communication apparatuses for communication of information. The two ends of the communication wire 3 can be directly pulled out from the wire-winding box, and a certain restoring tensile force can be kept at the two ends of the communication wire 3 due to the action of the scroll spring 4 in the box. Therefore, the communication wire 3 can be successfully wound back into the box so that entanglement of the external wire can be avoided.

To prevent disturbance of the tensile force to a user when he pulls out the communication wire 3, a plurality of retaining grooves 211 are disposed at the periphery of the first disk body 21 of the wire-winding disk 2, and a reciprocating control device 5 is disposed adjacent to the wire-winding disk 2. The reciprocating control device 5 comprises a swing sheet 51 capable of swinging freely and a ratchet capable of rotating freely. Through mutual relationships between the swing sheet 51, the ratchet 52, and the retaining grooves 211 of the wire-winding disk 2, the communication wire 3 can be fixed or wound back by repetitive pull and release actions.

In the present invention, the communication wire 3 is respectively disposed on the first disk body 21 and the second disk body 22. The first outer ring portion 33, the second outer ring portion 35, and the inner ring portion 34 of the communication wire 3 are disposed on the first wire-winding shaft 23, the second wire winding shaft 25, and outside the shaft body 24, respectively. When the communication wire 3 is wound around the wire-winding disk 2, the first outer ring portion 33, the inner ring portion 34, and the second outer ring portion 35 are staggered to reduce the diameter of the wire-winding disk 2. Therefore, the volume of the wire-winding box can be shrunk to conform to the requirement of compactness. Moreover, the present invention has dual wire outlets to facilitate usage of the wire-winding box.

Figure 8:
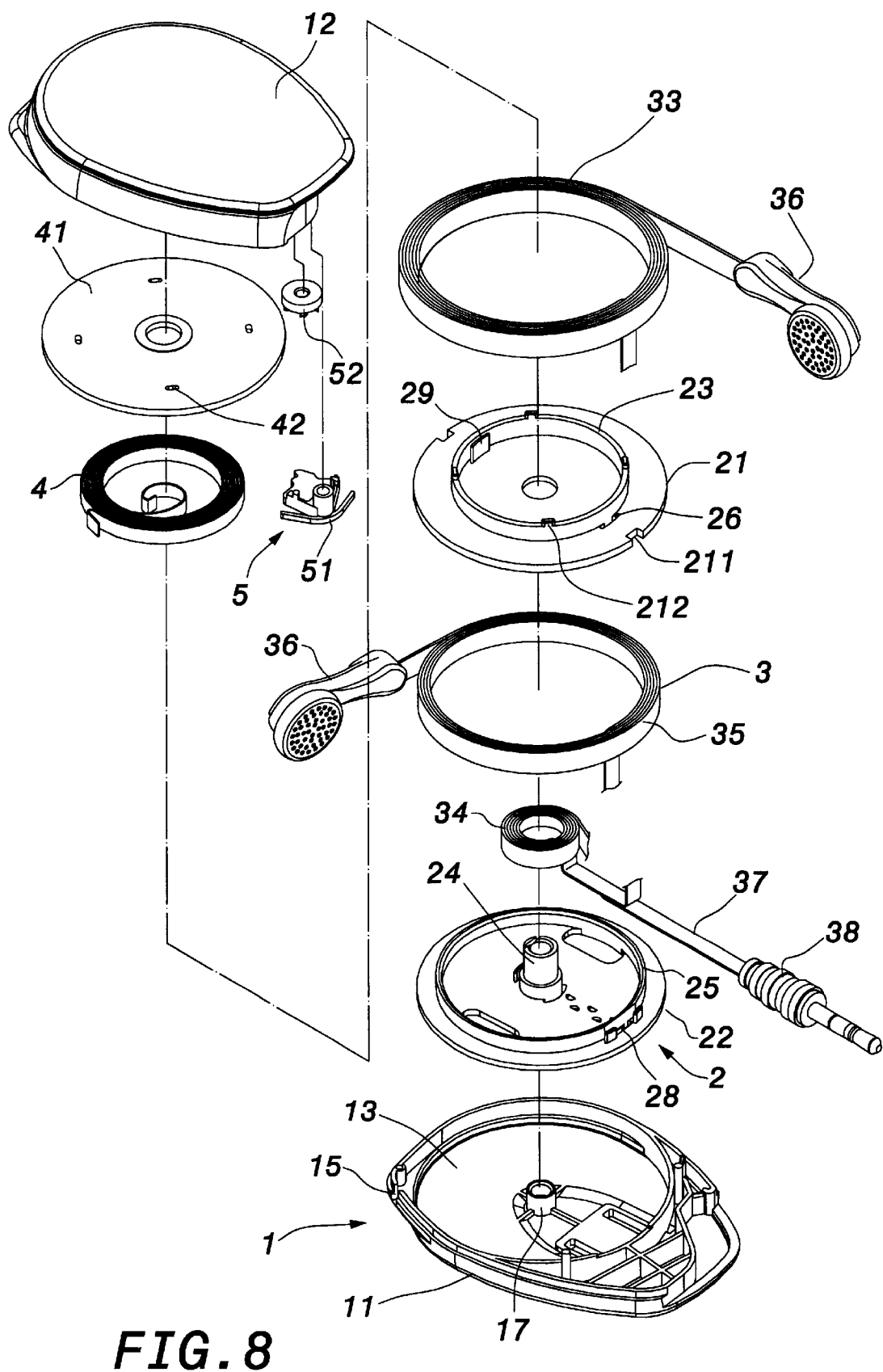
FIG. 8 is an exploded perspective view according to another embodiment of the present invention.

Additionally, as shown in FIG. 8, both ends of the communication wire 3 can join devices such as earphones 36. Moreover, the inner ring portion 34 of the communication wire 3 is connected to another device such as a plug 38 via a connection wire 37. Therefore, a user can plug the plug connected with the communication wire 3 into a socket of relevant communication apparatuses for communication of downloaded information so that the downloaded information can be transferred to the two earphones 36.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

I claim:

1. A wire-winding mechanism having dual wire outlets, comprising:

a wire-winding box body having a receiving room therein;

a wire-winding disk composed of a first disk body and a second disk body, said first and second disk bodies being pivotally joined together, a face of said first disk body having a first wire-winding shaft, a face of said second disk body having a shaft body and a second wire-winding shaft, said wire-winding disk being pivotally disposed in said receiving room of said wire-winding box body;

a communication wire, one end of said communication wire being wound around said shaft body of said second disk body of said wire-winding disk to form an inner ring portion, and then wound around said first wire-winding shaft of said first disk body of said wire-winding disk to form a first outer ring portion, the other end of said communication wire being wound around said second wire-winding shaft of said second disk body to form a second outer ring portion; and a scroll spring connected between said first disk body and said second disk body.

2. The wire-winding mechanism having dual wire outlets as claimed in claim 1, wherein said wire-winding box body comprises a first half body and a second half body.

3. The wire-winding mechanism having dual wire outlets as claimed in claim 1, wherein a border of said receiving room of said wire-winding box body has a first wire hole to be protruded out by one end of said communication wire and a second wire hole to be protruded out by the other end of said communication wire.

4. The wire-winding mechanism having dual wire outlets as claimed in claim 1, wherein an inner side face of said receiving room of said wire-winding box body has a projective shaft, the other opposed side face thereof has a bushing for insertion and positioning of one end of said projective shaft, and said wire-winding disk is pivotally disposed on said projective shaft through said shaft body.

5. The wire-winding mechanism having dual wire outlets as claimed in claim 1, wherein said first disk body of said wire-winding disk has a first wire-penetrating hole, and said second disk body has a second wire-penetrating hole and a third wire-penetrating hole, said communication wire protruding out of said second wire-penetrating hole to be wound around said shaft body to form said inner ring portion, and then wound around said first wire-winding shaft to form said first outer ring portion, the other end of said communication wire penetrating through said third wire-penetrating hole to be wound around said second wire-winding shaft to form said second outer ring portion.

6. The wire-winding mechanism having dual wire outlets as claimed in claim 1, wherein a periphery of said first disk body of said wire-winding disk has a plurality of retaining grooves, and a reciprocating control device is disposed adjacent to said wire-winding disk, said reciprocating control device comprising a swing sheet capable of swinging freely and a ratchet capable of rotating freely.

7. The wire-winding mechanism having dual wire outlets as claimed in claim 1, wherein the two ends of said communication wire can join plugs and earphones.

8. The wire-winding mechanism having dual wire outlets as claimed in claim 1, wherein the two ends of said communication wire join earphones, and said inner ring portion of said communication wire is connected to a plug via a connection wire.

9. The wire-winding mechanism having dual wire outlets as claimed in claim 1, wherein said scroll spring is positioned in said first wire-winding shaft of said first disk body of said wire-winding disk, and two ends of said scroll spring are retained with a retaining sheet of said first disk body and said shaft body of said second disk body, respectively.

10. The wire-winding mechanism having dual wire outlets as claimed in claim 9, wherein a cover body is retained on said first wire-winding shaft of said first disk body of said wire-winding disk.

11. The wire-winding mechanism having dual wire outlets as claimed in claim 10, wherein said cover body has a plurality of retaining holes thereon, said first wire-winding shaft has a plurality of corresponding retaining bodies, and said retaining holes and said retaining bodies are retained together so that said cover body can be fixedly retained on said first wire-winding shaft.

\* \* \* \* \*